(12) United States Patent
Hertz et al.

(10) Patent No.: US 10,937,554 B2
(45) Date of Patent: Mar. 2, 2021

(54) ABSORBER ROD ASSEMBLY FOR NUCLEAR REACTOR

(71) Applicant: FRAMATOME, Courbevoie (FR)

(72) Inventors: Dominique Hertz, Sainte-Foy-les-Lyon (FR); Marcel Bouffier, Chaponnay (FR); Laurent Gauthier, Oullins (FR)

(73) Assignee: FRAMATOME, Courbevoie (FR)

( * ) Notice: Subject to any disclaimer, the term of this patent is extended or adjusted under 35 U.S.C. 154(b) by 244 days.

(21) Appl. No.: 16/060,368

(22) PCT Filed: Dec. 15, 2016

(86) PCT No.: PCT/EP2016/081158
§ 371 (c)(1),
(2) Date: Jun. 7, 2018

(87) PCT Pub. No.: WO2017/102928
PCT Pub. Date: Jun. 22, 2017

(65) Prior Publication Data
US 2018/0374590 A1 Dec. 27, 2018

(30) Foreign Application Priority Data
Dec. 15, 2015 (FR) ....................................... 1562437

(51) Int. Cl.
*G21C 7/24* (2006.01)
*G21C 7/117* (2006.01)
*G21C 1/08* (2006.01)

(52) U.S. Cl.
CPC ................ *G21C 7/24* (2013.01); *G21C 7/117* (2013.01); *G21C 1/086* (2013.01); *Y02E 30/30* (2013.01)

(58) Field of Classification Search
CPC ........... G21C 7/24; G21C 1/086; G21C 7/117
(Continued)

(56) References Cited

U.S. PATENT DOCUMENTS

| 3,219,593 A | 11/1965 | Kling et al. |
| 4,678,628 A | 7/1987 | Freeman |
| 6,669,893 B1 * | 12/2003 | Provot ..................... G21C 7/24 |
| | | 264/642 |

FOREIGN PATENT DOCUMENTS

| FR | 2741186 A1 | 5/1997 |
| JP | S56076091 | 6/1981 |

(Continued)

OTHER PUBLICATIONS

Corresponding Search Report for PCT/ EP2016/081158.
(Continued)

*Primary Examiner* — Jack W Keith
*Assistant Examiner* — Daniel Wasil
(74) *Attorney, Agent, or Firm* — Davidson, Davidson & Kappel, LLC

(57) ABSTRACT

An absorber cluster for a nuclear reactor includes at least a first absorber assembly and a second absorber assembly. Each absorber assembly respectively comprises neutron absorbing elements. Absorber elements of each of the first absorber assembly and the second absorber assembly are made from the same material or the same combination of materials selected from the group of neutron absorbing materials consisting of a first europium hafnate, a second europium hafnate, a first samarium hafnate, a second samarium hafnate, hafnium carbide, and samarium hexaboride. The first europium hafnate and the second europium hafnate have different compositions. The first samarium hafnate and the second samarium hafnate have different compositions. The absorber elements of the first absorber assembly have a cross-sectional structure different to that of the absorber elements of the second absorber assembly.

25 Claims, 3 Drawing Sheets

(58) Field of Classification Search
USPC .......................................................... 376/339
See application file for complete search history.

(56) References Cited

FOREIGN PATENT DOCUMENTS

| | | |
|---|---|---|
| JP | 2011191145 A | 9/2011 |
| JP | 5104238 B2 | 12/2012 |
| WO | WO2013079662 A1 | 6/2013 |

OTHER PUBLICATIONS

Andrievskaya, "Phase equilibria in the refractory oxide systems of zirconia, hafnia and yttria with rare-earth oxides," Journal of the European Ceramic Society 28 (2008) 2363-2388.

* cited by examiner

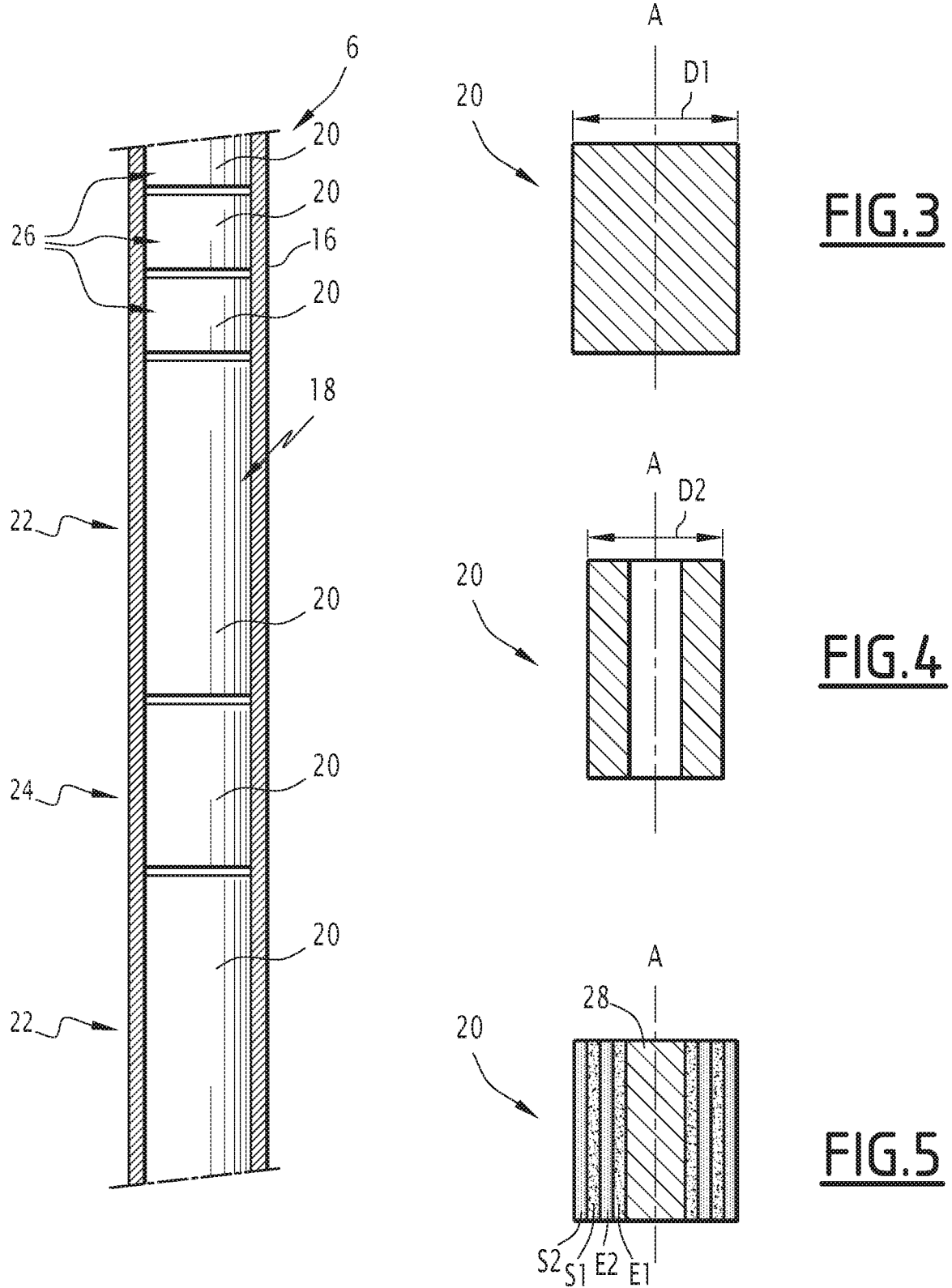

ABSORBER ROD ASSEMBLY FOR NUCLEAR REACTOR

The invention relates to the field of absorber clusters for a pressurized water nuclear reactor.

BACKGROUND

Pressurized Water Reactors (PWR) comprise a core comprising a plurality of nuclear fuel assemblies juxtaposed in a reactor vessel.

A nuclear fuel assembly comprises a bundle of fuel rods inserted in a support structure, wherein the support structure comprises a lower nozzle and an upper nozzle between which are arranged the fuel rods, guide tubes connecting the lower end and the upper end, and spacer grids fixed on the guide tubes and distributed along the guide tubes between the upper and lower nozzles, wherein the spacer grids hold the fuel rods.

The purpose of the guide tubes is to ensure the rigidity of the support structure and to allow neutron absorbing rods used to moderate the reactivity of the core of the nuclear reactor to be inserted into the nuclear fuel assembly.

The absorber rods are connected together at their upper end by a support. The assembly formed by the support and the bundle of absorber rods carried by the support is called an absorber cluster. The support generally has a star shape, sometimes referred to as the spider, or a substantially square perforated form called a support plate or plate.

It is possible to provide mobile absorber clusters, also called control clusters or regulation clusters, each of which is suspended by its respective spider to a control rod of a cluster control mechanism of the nuclear reactor, and is movable vertically during normal operation of the reactor in order to lower their absorber rods to a greater or lesser extent in the guide tubes of nuclear fuel assemblies in order to adjust the reactivity of the core of the nuclear reactor.

These control clusters are raised to increase the reactivity of the core of the nuclear reactor or lowered to reduce the reactivity of the core of the nuclear reactor.

These control clusters are dissociated from the control rod in order to quickly and completely lower the absorber rods into the nuclear fuel assemblies to stop the nuclear reactor.

It is possible to provide control clusters of different types, for example highly-absorbent control clusters, or black clusters, and less absorbent control clusters, or gray clusters, in different areas of the nuclear reactor core. The absorbent gray clusters usually have absorber rods whose absorbency is adapted to the required level, and are generally inert rods made of steel.

It is also possible to provide fixed absorber clusters, wherein the rods carried by a support plate remain inserted in the corresponding nuclear fuel assemblies during normal operation of the nuclear reactor, in areas where it is desired to limit the reactivity of the core.

Such fixed absorber clusters are, for example, arranged in nuclear fuel assemblies located on the periphery of the nuclear reactor core in order to reduce neutron activity and limit the irradiation of the vessel.

The fixed absorber clusters have absorber rods whose absorbency is adapted to the required level, and possibly inert rods generally in the form of short steel bars.

Whether an absorber cluster is fixed or mobile, its absorber rods generally comprise a tubular sheath and an absorber column formed by a stack of cylindrical absorber elements made of neutron absorbing materials. Absorber elements are generally provided in the form of circular cylindrical pellets with a height of between 10 and 20 mm and a diameter of between 7 and 9 mm, or sections of a cylindrical bar with a diameter substantially identical to that of the pellets whose length may reach several centimeters or even several meters, i.e. the total length of the absorber column. In some cases, an absorber rod may be directly constituted by an unsheathed bar and made of absorbent material.

The height of the absorber column of the absorber rods of the absorber clusters is at least equal to that of the column of fissile material contained in the fuel rods to allow the complete recovery of the fissile column by the absorber column of the fixed absorber clusters and the mobile absorber clusters when fully inserted into the nuclear reactor core.

The absorber rods of the fixed absorber clusters generally consist of a steel sheath containing vitrified borosilicate in the form of a tube.

It is possible to use sheathed absorber rods comprising absorber elements made of silver-indium-cadmium (SIC), absorber elements made of dysprosium titanate, absorber elements made of dysprosium hafnate and/or absorber elements made of boron carbide ($B_4C$), or unsheathed hafnium based absorber rods for mobile absorber clusters.

It is possible, in particular, to use absorber rods containing, in their lower part, absorber elements made of silver-indium-cadmium (SIC) and, in their upper part, absorber elements made of boron carbide ($B_4C$).

This makes it possible, on the one hand, to have a neutron efficiency adapted to the normal operation of the reactor when the control clusters are not inserted at all, or only a little, or when the reactor is shut down, as a result of a higher neutron absorption in the upper part of the absorber rods when the control clusters are fully inserted and, on the other hand, have a large enough mass to ensure lowering of the control clusters within the times imposed by the safety rules in the event of an emergency shutdown of the nuclear reactor.

SUMMARY OF THE INVENTION

However, the components of SIC are rare materials (indium), toxic materials (cadmium), or lead to significant radioactive activity after irradiation (silver). In addition, under the effect of irradiation, SIC swells and may cause deformation and cracking of the sheath.

In addition, boron carbide produces helium and gaseous tritium under irradiation. Tritium migrates into the primary circuit through the steel sheaths. From 850° C. the boron carbide starts to react with the steel of the sheath. The reaction becomes significant from 1150° C., leading to embrittlement of the sheath.

One of the aims of the present disclosure is to provide an absorber cluster which has satisfactory neutron absorption and mass characteristics, avoids the use of silver-indium-cadmium alloy and limits or avoids, if possible, the use of boron carbide, and uses absorbent materials with little or no swelling under irradiation.

For this purpose, an absorber cluster for a pressurized water nuclear reactor is provided, comprising a bundle of absorber rods, wherein each absorber rod comprises a tubular sheath and an absorber column formed by a stack of neutron absorbing elements received inside the tubular sheath, wherein each absorber element extends along a longitudinal axis and has a cross-sectional structure determined by the cross-sectional geometry, the composition and the porosity of the absorber element, wherein the absorber columns contain at least two absorber assemblies, and wherein each absorber assembly consists of a plurality of absorber elements having the same cross-sectional structure, wherein the cluster comprises at least a first absorber assembly and a second absorber assembly, while the absorber elements of each of the first absorber assembly and the second absorber assembly are made from the same material or the same combination of materials selected from the group of neutron absorbing materials consisting of a first europium hafnate, a second europium hafnate, a first samarium hafnate, a second samarium hafnate, hafnium carbide and samarium hexaboride, wherein the absorber elements of the first absorber assembly have a different cross-sectional structure than that of the absorber elements of the second absorber assembly.

The absorber cluster optionally includes one or more of the following features, taken individually or in any technically feasible combination:

- the first samarium hafnate has a molar content of samarium oxide of between 8% and 20% and the second samarium hafnate has a molar content of samarium oxide of between 50% and 60%;
- the first europium hafnate has a molar content of europium oxide of between 43% and 54% and the second europium hafnate has a molar content of europium oxide of between 19% and 26%;
- the absorber elements of at least one absorber assembly are made from the first europium hafnate and/or the second europium hafnate,
- the absorber elements of the first absorber assembly are produced exclusively of first samarium hafnate, of second samarium hafnate, of first europium hafnate and/or of second europium hafnate, while the absorber elements of the second absorber assembly are produced exclusively of hafnium carbide;
- the absorber elements of the first absorber assembly and the absorber elements of the second absorber assembly are arranged in distinct absorber rods;
- it comprises as many absorber rods receiving absorber elements of the first absorber assembly as absorber rods receiving the absorber elements of the second absorber assembly;
- the absorber elements of the first absorber assembly and the absorber elements of the second absorber assembly are arranged in distinct absorber rods which are adjacent two by two;
- it exclusively comprises the first absorber assembly and the second absorber assembly;
- it comprises a third absorber assembly comprising absorber elements made exclusively of boron carbide, of samarium hexaboride, or of the first europium hafnate and/or the second europium hafnate;
- the absorber elements of the third absorber assembly are arranged in the absorber rods receiving the absorber elements of the first absorber assembly and the second absorber assembly, preferably in the upper part of the absorber rods;
- the absorber elements of at least one among the first absorber assembly and the second absorber assembly contain a plurality of different materials of the group of materials and/or the absorber elements of at least one among the first absorber assembly and the second absorber assembly contain only one material of the group of materials;
- it comprises at least one absorber column containing exclusively absorber elements of the same absorber assembly and/or at least one absorber column containing absorber elements of at least two distinct absorber assemblies;
- the absorber elements of the first absorber assembly and of the second absorber assembly are made from the same material or the same combination of materials from the group of materials, and differ in the geometry of their cross-section and/or a porosity rate;
- the absorber elements of at least one absorber assembly contain exclusively the first europium hafnate and/or the second europium hafnate;
- at least one absorber assembly has absorber elements having a multilayer cross-sectional structure comprising a plurality of layers each of which is made of a material or a combination of materials from the group of materials, wherein each absorber element comprises at least two layers of distinct compositions and/or distinct porosity levels;
- it comprises at least one absorber column containing absorber elements of the first absorber assembly and absorber elements of the second absorber assembly distributed along the absorber column in a repeated pattern;
- the first europium hafnate, the second europium hafnate, the first samarium hafnate, the second samarium hafnate, the hafnium carbide and/or the samarium hexaboride contained in the absorber elements of the first absorber assembly and the second absorber assembly are in cubic crystalline phase.

An absorber rod for a pressurized water nuclear reactor is also provided, comprising a tubular sheath and an absorber column formed by a stack of neutron absorbing elements received inside the sheath, wherein the absorber column contains at least two absorber elements and each absorber element is made of a material or combination of materials selected from the group of neutron absorbing materials consisting of a first europium hafnate, a second europium hafnate, a first samarium hafnate, a second samarium hafnate, hafnium carbide, and samarium hexaboride, wherein the absorber elements differ in cross-sectional structure.

BRIEF SUMMARY OF THE DRAWINGS

The invention and its advantages will be better understood upon reading the description which follows, given solely by way of example, and with reference to the appended drawings, wherein:

FIG. 2 shows a partial view in axial section of an absorber rod of the cluster of FIG. 1;

FIGS. 3 to 5 show sectional views of absorber elements that may be inserted into the rod of FIG. 2.

DETAILED DESCRIPTION

Figure 1:
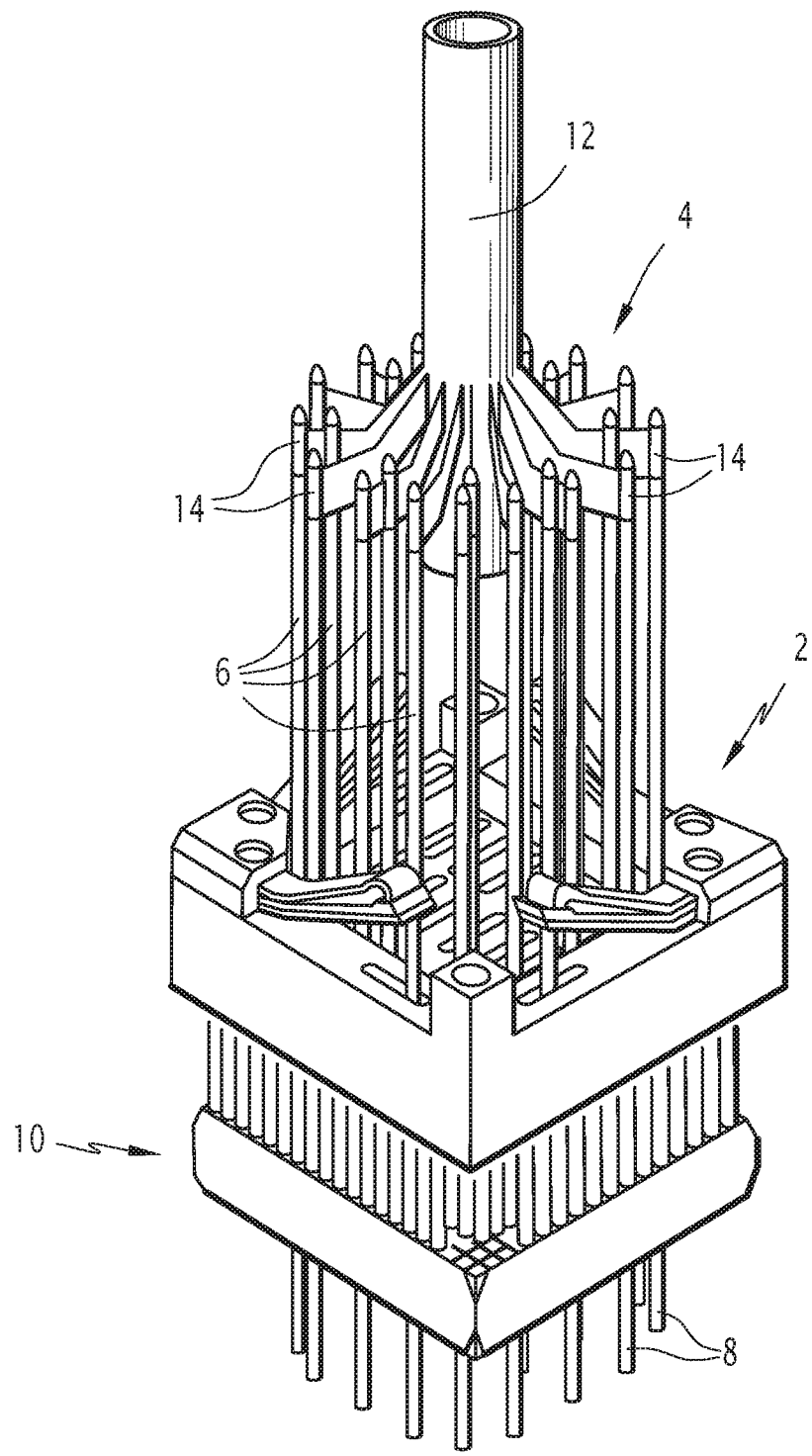
FIG. 1 shows a perspective view of a mobile absorber cluster, according to an embodiment of the invention for a pressurized water nuclear reactor, partially inserted into a nuclear fuel assembly.

The absorber cluster 2 shown in FIG. 1 comprises a support 4 and a bundle of absorber rods 6 carried by the support 4.

The support 4 maintains the absorber rods 6 in the form of a bundle, in which the absorber rods 6 are parallel to each other and so positioned to fit into the guide tubes 8 of a nuclear fuel assembly 10.

In operation, the absorber rods 6 extend substantially vertically. Subsequently, the terms "vertical" and "height" refer to the direction of vertical extension of the absorber rods 6.

The support 4 of the absorber cluster 2 of FIG. 1 has a star shape. It comprises a central pommel 12 from which arms 14, generally called fins, extend in the form of a star. Each arm 14 carries one or more absorber rods 6.

As illustrated in FIG. 2, each absorber rod 6 comprises a tubular sheath 16 and an absorber column 18 received inside the tubular sheath 16.

The absorber column 18 is formed by a stack of absorber elements 20 made of neutron absorbing materials. The absorber elements 20 are stacked vertically in the tubular sheath 16.

Each absorber element 20 has a circular cylindrical shape and extends along a longitudinal axis A. The longitudinal axis A is substantially vertical when the absorber element 20 is received in the tubular sheath 16.

The absorber elements 20 have the shape of cylindrical pellets or cylindrical bar sections or "bars". Preferably the absorber elements 20 are circular cylindrical pellets.

Each absorber element 20 has a height taken along its longitudinal axis A.

Each absorber element 20 has a cross-section taken perpendicular to the longitudinal axis A of the absorber element 20.

The cross-section has a specific geometric shape. The cross-section is for example tubular or solid. The cross-section is characterized, in particular, by an external diameter and, where appropriate, an internal diameter.

Each absorber element 20 comprises at least one layer. Each absorber element 20 comprises a single or a plurality of concentric layers centered on the longitudinal axis A. The number of layers and the thickness of the layers also determine the geometry of the cross-section of the absorber element 20.

Two distinct layers of an absorber element 20 differ in their composition (i.e. the materials or combinations of materials constituting these layers) and/or in the porosity rate of these layers.

Each absorber element 20 is made from a single material or a combination of different materials. Separate materials are arranged in separate layers or mixed in the same layer.

Each absorber element 20 has a cross-sectional structure determined by the geometry of the cross-section (solid, tubular, external diameter, internal diameter, number of layers, thickness of each layer, . . . ), the composition (material or combination of materials constituting each layer) and the porosity rate (porosity rate of each layer).

Two absorber elements 20 have identical cross-sectional structures if these cross-sectional structures have the same cross-sectional geometry, composition, and porosity rate, for each layer when the absorber element 20 comprises multiple layers.

Two absorber elements 20 have different cross-sectional structures if they differ by at least either the cross-sectional geometry, the composition and/or the porosity rate, for at least one layer if the absorber element comprises several layers.

The absorber columns 18 of the absorber cluster 2 contain at least two absorber assemblies 22, 24, 26, wherein each absorber assembly 22, 24, 26 consists of a plurality of absorber elements 20 having the same cross-sectional structure.

The absorber elements 20 of a same absorber assembly 22, 24, 26 have the same cross-sectional structure but may optionally have different heights. The absorber elements 20 of a same absorber assembly are identical or differ only in their height.

The absorber column 18 comprises at least a first absorber assembly 22 and a second absorber assembly 24.

The absorber elements 20 of the first absorber assembly 22 are made from the same material or the same combination of materials selected from the group of neutron absorbing materials consisting of a first europium hafnate, a second europium hafnate, a first samarium hafnate, a second samarium hafnate, hafnium carbide and samarium hexaboride.

The absorber elements 20 of the second absorber assembly 24 are also made from the same material or the same combination of materials chosen from among the group of neutron absorbing materials consisting of a first europium hafnate, a second europium hafnate, a first samarium hafnate, a second samarium hafnate, hafnium carbide and samarium hexaboride.

The absorber elements 20 of the first absorber assembly 22 differ from those of the second absorber assembly 24 by their cross-sectional structure, i.e. at least either the cross-sectional geometry, the composition and/or the porosity rate.

The expression "absorber element 20 made from a combination of materials" generally means that an absorber element 20 comprises a plurality of materials that are mixed in the same layer of the absorber element 20 and/or separated in separate layers of the absorber element 20 that are made, for example, of different absorbent materials.

The expressions "identical", "same material" or "same combination of materials", "same cross-sectional structure", "same cross-sectional geometry" and "same porosity rate" as used here extend to include the necessary manufacturing or measurements tolerances.

The expression "the absorber columns 18 contain at least two absorber assemblies 22, 24, 26" as used here means that the absorber assemblies 22, 24, 26 are present in the absorber columns 18 of the absorber cluster 2 taken as a whole.

Each absorber assembly 22, 24, 26 comprises several absorber elements 20 arranged in the same absorber column 18 and/or several absorber elements 20 distributed in several absorber columns 18 of the absorber cluster 2.

It is possible that the absorber elements 20 of two absorber assemblies 22, 24, 26 are contained in distinct respective absorber columns 18 and/or that the absorber elements 20 of two absorber assemblies 22, 24, 26 are contained in a same absorber column. 18.

The expressions "first europium hafnate" and "second europium hafnate" denote two defined compounds, formed, for example, by a reaction between hafnium oxide ($HfO_2$) and europium oxide ($Eu_2O_3$), possessing different compositions, and, in particular, europium molar contents located in separate ranges.

It should be noted that a "defined compound" is a compound whose phase change is at a constant temperature. A vertical line on a phase diagram indicates the presence of a defined compound.

Preferably, the first europium hafnate has a molar content of europium oxide of between 43% and 54%, while the second europium hafnate has a molar content of europium oxide of between 19% and 26%. These two materials have different absorption capacities and densities. In these two ranges, it is possible to obtain europium hafnate in cubic crystalline phase which has the advantage of no or little swelling under irradiation.

The europium hafnate, in the form of sintered pellets of the same dimensions, is a little more absorbent and about 4 times denser than boron carbide.

The europium hafnate does not generate a gaseous irradiation product and does not react with stainless steel up to at least 1300° C., an order of magnitude of the melting temperature of the steel, and does not cause exothermic reaction with water.

The expressions "first samarium hafnate" and "second samarium hafnate" denote two defined compounds, formed for example by a reaction between hafnium oxide ($HfO_2$) and samarium oxide ($Sm_2O_3$), having different compositions and, in particular, samarium molar contents located in separate ranges.

Preferably, the first samarium hafnate has a molar content of samarium oxide of between 8% and 20%, while the second samarium hafnate has a molar content of samarium oxide of between 50% and 60%. In these two ranges, it is possible to obtain samarium hafnate in cubic crystalline phase which has the advantage of no or little swelling under irradiation.

Samarium hafnate does not generate a gaseous irradiation product, does not react with stainless steel up to at least 1300° C., and does not cause an exothermic reaction with water. Samarium hafnate is less dense than SIC in the form of a stack of sintered pellets of the same dimensions as the SIC bars: the theoretical density of samarium hafnate is about 20% lower than that of SIC.

In the form of sintered pellets of the same size, the first samarium hafnate absorbs some fewer neutrons than the SIC, while the second samarium hafnate absorbs some more neutrons than the SIC, wherein the absorption difference is of the order of 10% respectively.

As the first samarium hafnate, the second samarium hafnate, the first europium hafnate and the second europium hafnate are miscible with each other and have similar sintering conditions, two or more of these absorbent materials may be mixed together in a same sintered absorber element 20.

At equivalent geometry, hafnium carbide (HfC) is slightly less absorbent than SIC, of the order of 5%. The theoretical density of hafnium carbide is about 20% higher than that of SIC.

The hafnium carbide does not generate a gaseous irradiation product, does not react with a stainless steel sheath at less than 1300° C., does not cause exothermic reaction with water, and is naturally in cubic phase.

When in the form of sintered pellets of the same dimensions, samarium hexaboride ($SmB_6$) is a little more absorbent and three times denser than boron carbide and is naturally in a cubic phase.

In one embodiment, the pellets are obtained by powder sintering with, if necessary, the addition of a pore-forming agent to adjust the porosity rate and/or sintering additive. The sintering is carried out continuously or in batches at a temperature of between 1400° C. and 1700° C. under air for europium hafnate or samarium hafnate and under vacuum or under neutral gas for samarium hexaboride. The sintering is carried out batchwise at a temperature between 1900° C. and 2200° C. under vacuum for hafnium carbide, or from a finely ground powder (crystallites<50 μm, preferably <20 μm), or by adding 1 to 2% $MoSi_2$ to sinter hafnium carbide.

In one embodiment, the absorber columns 18 of the absorber cluster 2 contain a different first absorber assembly 22 and second absorber assembly 24, whose absorber elements 20 differ in their compositions, i.e. by their materials or combinations of materials selected from among the group of materials.

The first absorber assembly 22 and the second absorber assembly 24 are contained in one or more absorber columns 18.

It is possible to arrange the first absorber assembly 22 and the second absorber assembly 24 in respective absorber columns 18 or to have the different first absorber assembly 22 and the second absorber assembly 24 in at least one same absorber column 18.

It is possible to provide at least one absorber column 18 comprising absorber elements of the first absorber assembly 22 and the second absorber assembly 24.

It is also possible to provide at least two absorber columns 18 respectively comprising the absorber elements 20 of only either the first absorber assembly 22 or the second absorber assembly 24.

In one embodiment, the absorber elements 20 of the first absorber assembly 22 are made from among the group of materials, exclusively first samarium hafnate, first europium hafnate, second samarium hafnate and/or second europium hafnate, while the absorber elements 20 of the second absorber assembly 24 are made exclusively of hafnium carbide.

In one embodiment, an absorber cluster 2 comprises an absorber column 18 containing only absorber elements 20 of the first absorber assembly 22 made, from among the group of materials, exclusively of first samarium hafnate, first europium hafnate, second samarium hafnate, and and/or second europium hafnate, and another absorber column 18 containing only absorber elements 20 of the second absorber assembly 24 made, from among the group of materials, exclusively of hafnium carbide.

The arrangement of the absorber elements 20 of the first absorber assembly 22 and the absorber elements 20 of the second absorber assembly 24 in two separate columns facilitates manufacture.

These two absorber columns 18 are preferably those of two adjacent absorber rods 6 of the absorber cluster 2 in order to obtain a neutron absorption that is substantially equivalent to that of two identical absorber columns containing SIC.

In general, the absorber elements 20 of the first absorber assembly 22 and the absorber elements 20 of the second absorber assembly 24 are disposed in absorber rods 6 which are distinct and adjacent in pairs. Each absorber rod 6 containing the absorber elements 20 of the first absorber assembly 22 is adjacent to an absorber rod 6 containing the absorber elements 20 of the second absorber assembly 24. Alternatively or optionally, at least one absorber column 18 contains, on the one hand, absorber elements 20 of the first absorber assembly 22, i.e. made, from the group of materials, exclusively of first samarium hafnate, first europium hafnate, second samarium hafnate and/or second europium samarium hafnate, and, on the other hand, absorber elements 20 of the second absorber assembly 24 made, from the group of materials, exclusively of hafnium carbide.

In one embodiment, in such an absorber column 18, the absorber elements 20 of the first absorber assembly 22 and the absorber elements 20 of the second absorber assembly 24 are distributed along the absorber column 18.

In this case, preferably, the absorber elements 20 of the first absorber assembly 22 and the absorber elements 20 of the second absorber assembly 24 are distributed in the absorber column 18 in a repeated pattern.

Different repeated patterns of the absorber elements 20 of the first absorber assembly 22 and absorber elements 20 of the second absorber assembly 24 are conceivable. Preferably, the repeated patterns are chosen in order to obtain a desired average linear neutron absorption over the entire length of the absorber column 18.

This embodiment may thus be used to replace the SIC in existing nuclear reactors with a neutron absorption and a mass that are substantially equivalent to those of the SIC, for example by combining, in suitable proportions, the second samarium hafnate (absorber elements of the first absorber assembly 22) and hafnium carbide (absorber elements of the second absorber assembly 24), because the second samarium hafnate is more absorbent but less dense than the SIC while the hafnium carbide is less absorbent but denser than the SIC.

In the case of new nuclear reactors, the adjustment of the proportions of each absorbent material makes it possible to obtain an absorber column 18 with a mass and absorption that are adapted to the needs defined by the designer of the reactor.

In one embodiment, and as illustrated in FIG. 2, in addition to the first absorber assembly 22 formed by absorber elements 20 made, for example, exclusively of the first samarium hafnate, the first europium hafnate, the second samarium hafnate and/or the second europium hafnate, and the second absorber assembly 24 formed by absorber elements 20 made, for example, exclusively of hafnium carbide, the absorber columns 18 contain a third absorber assembly 26 formed by absorber elements 20 made, for example, exclusively of carbide boron.

Such an absorber cluster 2 makes it possible, for example, to replace, in existing nuclear reactors, an absorber cluster whose absorber columns contain SIC and boron carbide, wherein the SIC is replaced by the combination of absorber elements made of first hafnate samarium, first europium hafnate, second samarium hafnate and/or second europium hafnate, and absorber elements made of hafnium carbide, and wherein the boron carbide is preserved.

In an absorber column 18 containing absorber elements 20 made of first samarium hafnate, first europium hafnate, second samarium hafnate and/or second europium hafnate (absorber elements 20 of the first absorber assembly 22) and/or absorber elements 20 made of hafnium carbide (absorber elements 20 of the second absorber assembly 24) and absorber elements 20 made of boron carbide (absorber elements 20 of the third absorber assembly 26), the absorber elements 20 of the first absorber assembly 22 and/or the absorber elements 20 of the second absorber assembly 24 are preferably disposed in the lower part of the absorber column 18, while the absorber elements 20 of the third absorber assembly 26 are disposed in the upper part of the absorber column 18.

In one embodiment, the absorber cluster 2 comprises an absorber column 18 comprising absorber elements 20 of the first absorber assembly 22 at the bottom and absorber elements 20 of the third absorber assembly 24 at the top, and another absorber column 18 containing absorber elements 20 of the second absorber assembly 24 in the lower part and absorber elements 20 of the third absorber element 26 in the upper part.

These two absorber columns 18 are preferably those of two adjacent absorber rods 6 of the absorber cluster 2.

The samarium hexaboride may advantageously be used to replace the boron carbide in the third absorber assembly 26 in order to benefit from a higher cluster mass for an at least equal absorbency.

Thus, in the various embodiments indicated above, all or part of the boron carbide may be replaced by samarium hexaboride.

Alternatively, first europium hafnate, second europium hafnate or a combination of first europium hafnate and second europium hafnate that is of adequate composition to achieve the intended mass and absorbency, may be used to replace all or part of the boron carbide in the absorber elements 20 of the third absorber assembly 26.

In particular, in one embodiment, the absorber columns 18 of the absorber cluster 2 comprise absorber elements 20 of the first absorber assembly 22 made of first samarium hafnate, first europium hafnate, second samarium hafnate and/or second europium hafnate, and absorber elements 20 of the second absorber assembly 24 made of hafnium carbide, wherein the absorber elements 20 of the first absorber assembly 22 and the second absorber assembly 24 are located in the lower part of the absorber columns 18, and a third absorber assembly 26 located in the upper part of the absorber columns 18 and consisting of absorber elements 20 made of boron carbide, samarium hexaboride or a material or a combination of materials selected from the first europium hafnate and the second europium hafnate.

The first samarium hafnate, the second samarium hafnate, the first europium hafnate and the second europium hafnate have different absorption capacities and different densities. Their combination thus makes it possible to obtain a satisfactory compromise between the neutron absorption and the mass of the absorber cluster 2 as a whole, wherein the latter is sufficient in the case of a control cluster to ensure the lowering of the control cluster within the times imposed by the safety rules in case of an emergency shutdown of the nuclear reactor.

In one embodiment, an absorber cluster 2 comprises a first absorber assembly 22 whose absorber elements 20 are made exclusively of hafnium carbide and a second absorber assembly 24 whose absorber elements 20 are made of first samarium hafnate, second samarium hafnate, first europium hafnate and/or second europium hafnate. The absorber elements 20 of the first absorber assembly 22 and those of the second absorber assembly 24 are either mixed in the absorber rods 6 or distributed in distinct absorber rods 6 of the absorber cluster 2. Optionally, the absorber cluster 2 further comprises a third absorber assembly 26 whose absorber elements 20 are made either of samarium hexaborure or first europium hafnate and/or second europium hafnate, wherein the absorber elements 20 of the third absorber assembly 26 are arranged in the upper part of each absorber rod 6 of the absorber cluster 2.

In order to adjust the neutron absorption and/or mass of the various absorber rods 6 of the absorber cluster 2, it is possible to adapt the cross-sectional structures of the absorber elements 20 by changing the geometry of the cross-section of the absorber elements 20 and/or the porosity rate of the absorbent material in order to modify the density of the absorbent material constituting the absorber elements with respect to the theoretical density of the said material.

It is also possible to prepare absorber assemblies 22, 24, 26 consisting of absorber elements 20 made of the same material or the same combination of materials from among the group of materials, but whose cross-sectional structures have different geometries and/or different porosity rates (and thus densities), so that the absorber elements 20 of an absorber assembly, although made of the same material or the same combination of materials from among the group of materials, have a neutron absorption capacity and/or a mass that are/is different from those/that of the absorber elements 20 of another absorber assembly.

In one absorber element 20, the neutrons are first absorbed by the peripheral zone of the absorber element, then progressively through the intermediate zones until they reach the central zone.

In one embodiment, the absorber elements 20 of a first absorber assembly 22 are solid cylindrical, as shown in FIG. 3, and the absorber elements 20 of a second absorber assembly 24 are tubular cylindrical, as shown in FIG. 4. In a variant of the embodiment, the absorber elements 20 of the first absorber assembly 22 and those of the second absorber assembly 24 are made from the same material or combination of materials.

Alternatively or optionally, the absorber elements 20 of the first absorber assembly 22 have an outer diameter D1 that is strictly greater than D2 of the absorber elements 20 of the second absorber assembly 24, as shown in FIGS. 3 and 4.

In one embodiment, at least one absorber assembly comprises absorber elements 20 containing at least two materials from the group of materials.

In one embodiment, at least one absorber assembly comprises absorber elements 20 containing a combination of the first europium hafnate and the second europium hafnate, or containing a combination of the first samarium hafnate and the second samarium hafnate.

In one embodiment, at least one absorber assembly comprises absorber elements 20 containing in combination at least two hafnates chosen from among the first europium hafnate, the second europium hafnate, the first samarium hafnate and the second samarium hafnate.

Various embodiments may be implemented to obtain such an absorber element 20.

In one embodiment, the absorber element 20 is homogeneous and obtained by sintering as a solid or tubular pellet of a mixture with the desired proportions of different hafnate powders.

As illustrated in FIG. 5, in one embodiment, the absorber element 20 comprises, for example, at least two superposed layers made up of different hafnates chosen from among the first europium hafnate, the second europium hafnate and the first samarium hafnate and the second samarium hafnate.

In the example illustrated in FIG. 5, the absorber element 20 comprises a layer made of first europium hafnate E1 disposed on a cylindrical core 28, a layer made of second europium hafnate E2, and a layer made of first samarium hafnate S1 and a layer made of second samarium hafnate S2. The layers here are concentric and centered on the axis A of the absorber element 20 in the form of a cylindrical pellet.

The layers E1, E2, S1 and/or S2 are for example successively deposited on the cylindrical core 28, for example by vapor deposition or by additive manufacturing. The core 22 is, for example, made of absorbent material ($HfO_2$, HfC, . . . ) or non-absorbent ($ZrO_2$, C, . . . ).

Alternatively, an absorber element 20 is provided in the form of a tubular cylindrical pellet consisting of at least two superimposed layers consisting of different hafnates chosen from among the first europium hafnate, the second europium hafnate, the first samarium hafnate and the second samarium hafnate, without a central core. The layers of such an absorber element 20 are formed, for example, by additive manufacturing, optionally on a fusible or sacrificial core which is then removed.

The cross-sectional geometry (inside diameter, outside diameter, number of layers, thickness of each layer), and the porosity rate (density) and the composition (material or combination of materials) of the successive layers are adapted to obtain the mass and the neutron absorption required for the cluster throughout its lifetime.

The tubular sheath 16 of the absorber rods 6 is preferably a stainless steel sheath, for example an AISI304 or AISI316L sheath, or a hafnium base sheath.

The absorber cluster 2 shown in FIG. 1 is a movable absorber cluster, or control or regulating cluster, which is vertically movable during normal reactor operation to drive its absorber rods 6 more or less into the nuclear fuel assembly 10 in order to regulate the reactivity of the nuclear reactor core. For the positions in the reactor core requiring a lower absorbency, some of the absorber rods of the cluster 2 may be replaced by steel rods.

Alternatively, the absorber cluster 2 is a fixed absorber cluster, whose absorber rods 6 remain permanently lowered in the nuclear fuel assembly 10 during normal operation of the nuclear reactor, wherein the nuclear fuel assembly 10 is, for example, located at the periphery of the nuclear reactor core.

Figure 6:
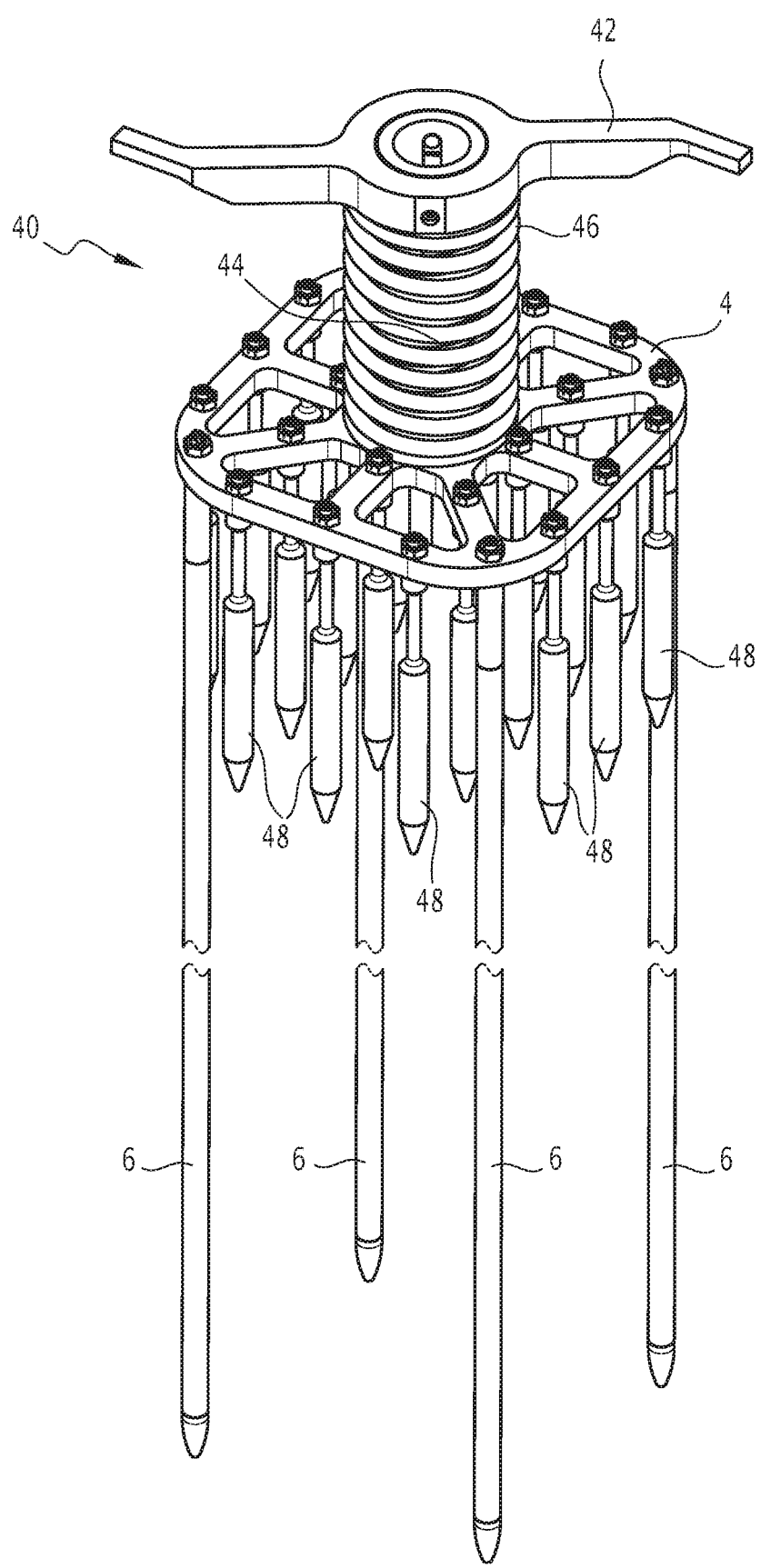
FIG. 6 shows a perspective view of a fixed absorber cluster according to an embodiment of the invention.

Such a fixed absorber cluster 2 is illustrated in FIG. 6. It comprises absorber rods 6 carried by a support 4 in the form of a support plate. It also comprises a pusher assembly 40 comprising a support bar 42 and two coaxial helical springs 44, 46 interposed between the support 4 and the support bar 42. The springs 44, 46 are designed to push the support 4 downwards by bearing on the support bar 42, wherein the latter bears on the upper core plate of the nuclear reactor.

The number of absorber rods 6, the length of the absorber column 18 and the nature of the absorbent material (absorbent or combination of absorbent materials of the group of materials) are adapted to obtain the target neutron absorption at the desired location. The other rods of the fixed absorber cluster are, for example, short steel rods called plug rods 48. The absorber cluster 2 illustrated in FIG. 6 comprises absorber rods 6 and plug rods 48.

Absorber rods 6 have a satisfactory neutron absorption capacity that is at least equal to that of an absorber rod using SIC and/or boron carbide, while obtaining a mobile absorber cluster 2 having a comparable mass in order to ensure the lowering of the mobile cluster under the same conditions.

In addition, the absorbent materials of the material group make it possible to obtain more interesting performances, in particular in the case of incidents and accidents in the reactors or in factory manufacture.

In fact, these materials, with the exception of samarium hexaboride (SmB6), do not produce gaseous irradiation products, do not react with the stainless steel sheath below high temperatures, and do not have an exothermic reaction with water in the event of leakage of an absorber rod.

What is claimed is:

1. An absorber cluster for a pressurized water nuclear reactor, comprising:
a cluster of absorber rods, each absorber rod comprising a tubular sheath and an absorber column formed by a stack of neutron absorbing elements received within the tubular sheath, each of the neutron absorbing elements extending along a longitudinal axis and having a cross-sectional structure determined by a cross-sectional geometry, a composition and a porosity of the neutron absorbing element, the absorber columns containing at least two absorber assemblies and each of the absorber assemblies consists of a plurality of the neutron absorbing elements having a same cross-sectional structure, the absorber rods being configured for being movable vertically during normal operation of the pressurized water nuclear reactor in order adjust a reactivity of the core of the pressurized water nuclear reactor, the cluster comprising at least a first absorber assembly of the absorber assemblies and a second absorber assembly of the absorber assemblies, the neutron absorbing elements respectively of the first absorber assembly and the second absorber assembly being formed from a same material or a same combination of materials selected from the group of neutron absorbing materials consisting of a first europium hafnate, a second europium hafnate, a first samarium hafnate, a second samarium hafnate, hafnium carbide and samarium hexaboride, the first europium hafnate and the second europium hafnate being two defined compounds each formed by a reaction between hafnium oxide and europium oxide, the first europium hafnate and the second europium hafnate having different compositions, the first samarium hafnate and the second samarium hafnate being two defined compounds each formed by a reaction between hafnium oxide and samarium oxide, the first samarium hafnate and the second samarium hafnate having different compositions, the cross-sectional structure of the neutron absorbing elements of the first absorber assembly being different from the cross-sectional structure of the neutron absorbing elements of the second absorber assembly before a first use of the absorber cluster in the pressurized water nuclear reactor.

2. The absorber cluster according to claim 1, wherein the neutron absorbing elements of at least one of the first absorber assembly and the second absorber assembly are formed from the first samarium hafnate, and the first samarium hafnate has a molar content of samarium oxide of between 8% and 20%.

3. The absorber cluster according to claim 1, wherein the neutron absorbing elements of at least one of the first absorber assembly and the second absorber assembly are formed from the first europium hafnate, and the first europium hafnate has a molar content of europium oxide of between 43% and 54%.

4. The absorber cluster according to claim 1, wherein the neutron absorbing elements of at least one of the absorber assemblies are made from the first europium hafnate and/or second hafnate europium.

5. The absorber cluster according to claim 1, wherein the neutron absorbing elements of the first absorber assembly are made exclusively of neutron absorbing materials of the group consisting of the first samarium hafnate, the second samarium hafnate, the first europium hafnate and second europium hafnate, while the neutron absorbing elements of the second absorber assembly are made exclusively of hafnium carbide.

6. The absorber cluster according to claim 5, wherein the neutron absorbing elements of the first absorber assembly and the neutron absorbing elements of the second absorber assembly are disposed in distinct absorber rods.

7. The absorber cluster according to claim 6, wherein the absorber rods include as many absorber rods receiving neutron absorbing elements of the first absorber assembly as absorber rods receiving the neutron absorbing elements of the second absorber assembly.

8. The absorber cluster according to claim 5, wherein the neutron absorbing elements of the first absorber assembly and the neutron absorbing elements of the second absorber assembly are arranged in distinct absorber rods which are adjacent in pairs.

9. The absorber cluster according to claim 5, wherein the absorber assemblies of the absorber cluster are exclusively the first absorber assembly and the second absorber assembly.

10. The absorber cluster according to claim 5, wherein the absorber assemblies include a third absorber assembly comprising a plurality of the neutron absorbing elements made exclusively of boron carbide, exclusively of samarium hexaboride, or exclusively of materials of the group consisting of the first europium hafnate and the second europium hafnate.

11. The absorber cluster according to claim 10, wherein the neutron absorbing elements of the third absorber assembly are arranged in the absorber rods receiving the neutron absorbing elements of the first absorber assembly and the second absorber assembly.

12. The absorber cluster according to claim 10, wherein the neutron absorbing elements of the third absorber assembly are arranged in the absorber rods receiving the neutron absorbing elements of the first absorber assembly and the second absorber assembly in the upper part of the absorber rods.

13. The absorber cluster according to claim 1, wherein the neutron absorbing elements of at least one of the first absorber assembly and the second absorber assembly contain a plurality of different materials from among the group of materials.

14. The absorber cluster according to claim 1, wherein at least one of the absorber columns exclusively contains neutron absorbing elements of a same absorber assembly.

15. The absorber cluster according to claim 1, wherein the neutron absorbing elements of the first absorber assembly and the second absorber assembly are made from the same material or the same combination of materials of the group of materials, and differ in the geometry of their cross-section and/or porosity rate.

16. The absorber cluster according to claim 1, wherein the neutron absorbing elements of at least one of the absorber assemblies contain exclusively materials of the group consisting of the first europium hafnate and the second europium hafnate.

17. The absorber cluster according to claim 1, wherein at least one of the absorber assemblies has a plurality of the neutron absorbing elements having a multilayer cross-sectional structure comprising a plurality of layers each made of a material or a combination of materials from among the group of materials, wherein each of the neutron absorbing element having a multilayer cross-sectional structure comprises at least two layers of distinct compositions and/or distinct porosity rates.

18. The absorber cluster according to claim 1, wherein at least one of the absorber columns contains the neutron absorbing elements of the first absorber assembly and the neutron absorbing elements of the second absorber assembly that are distributed along the absorber column in a repeated pattern.

19. The absorber cluster according to claim 1, wherein the first europium hafnate, the second europium hafnate, the first samarium hafnate, the second samarium hafnate, the hafnium carbide and/or the samarium hexaboride contained in the neutron absorbing elements of the first absorber assembly and the second absorber assembly are in cubic crystalline phase.

20. The absorber cluster according to claim 1, wherein the neutron absorbing elements of at least one of the first absorber assembly and the second absorber assembly contain a single material of the group of materials.

21. The absorber cluster according to claim 1, wherein at least one absorber columns contains neutron absorbing elements of at least two distinct absorber assemblies.

22. The absorber cluster according to claim 1, wherein the neutron absorbing elements of at least one of the first absorber assembly and the second absorber assembly are formed from the second samarium hafnate, and the second samarium hafnate has a molar content of samarium oxide of between 50% and 60%.

23. The absorber cluster according to claim 1, wherein the neutron absorbing elements of at least one of the first absorber assembly and the second absorber assembly are formed from the second europium hafnate, and the second europium hafnate has a molar content of europium oxide of between 19% and 26%.

24. An absorber rod for a pressurized water nuclear reactor, comprising:
a tubular sheath and an absorber column formed by a stack of neutron absorbing elements received within the sheath, the absorber column containing at least two neutron absorbing elements, each neutron absorbing element being made of a material or a combination of materials selected from a group of neutron absorbing materials consisting of first europium hafnate, a second europium hafnate, a first samarium hafnate, a second samarium hafnate, hafnium carbide, and samarium hexaboride, the neutron absorbing elements differing in their cross-sectional structure before first use of the absorber rod in the pressurize water nuclear reactor, the first europium hafnate and the second europium hafnate being two defined compounds each formed by a reaction between hafnium oxide and europium oxide and having different compositions, the first samarium hafnate and the second samarium hafnate being two defined compounds each formed by a reaction between hafnium oxide and samarium oxide and having different compositions,
the absorber rod being configured for being movable vertically during normal operation of the pressurized water nuclear reactor in order adjust a reactivity of the core of the pressurized water nuclear reactor.

25. An absorber cluster for a pressurized water nuclear reactor, comprising:
a cluster of absorber rods, each absorber rod comprising a tubular sheath and an absorber column formed by a stack of neutron absorbing elements received within the tubular sheath, each of the neutron absorbing elements extending along a longitudinal axis and having a cross-sectional structure determined by a cross-sectional geometry, a composition and a porosity of the neutron absorbing element, the absorber columns containing at least two absorber assemblies and each of the absorber assemblies consists of a plurality of the neutron absorbing elements having a same cross-sectional structure,
the cluster comprising at least a first absorber assembly of the absorber assemblies and a second absorber assembly of the absorber assemblies, the neutron absorbing elements respectively of the first absorber assembly and the second absorber assembly being formed from a same material or a same combination of materials selected from the group of neutron absorbing materials consisting of a first europium hafnate, a second europium hafnate, a first samarium hafnate, a second samarium hafnate, hafnium carbide and samarium hexaboride,
the first europium hafnate and the second europium hafnate being two defined compounds each formed by a reaction between hafnium oxide and europium oxide, the first europium hafnate and the second europium hafnate having different compositions;
the first samarium hafnate and the second samarium hafnate being two defined compounds each formed by a reaction between hafnium oxide and samarium oxide, the first samarium hafnate and the second samarium hafnate having different compositions,
the cross-sectional structure of the neutron absorbing elements of the first absorber assembly being different from the cross-sectional structure of the neutron absorbing elements of the second absorber assembly before first use of the absorber cluster in the pressurized water nuclear reactor
wherein the neutron absorbing elements of the first absorber assembly are made exclusively of neutron absorbing materials of the group consisting of the first samarium hafnate, the second samarium hafnate, the first europium hafnate and the second europium hafnate, while the neutron absorbing elements of the second absorber assembly are made exclusively of hafnium carbide.

* * * * *